US 6,564,290 B1

(12) United States Patent
Lechner

(10) Patent No.: US 6,564,290 B1
(45) Date of Patent: May 13, 2003

(54) DATA CARRIER ARCHIVING AND CONTROL SYSTEM

(75) Inventor: Ulrich Lechner, Oettingen (DE)

(73) Assignee: Grau Software GmbH (DE)

( * ) Notice: Subject to any disclaimer, the term of this patent is extended or adjusted under 35 U.S.C. 154(b) by 0 days.

(21) Appl. No.: 09/123,628

(22) Filed: Jul. 28, 1998

(30) Foreign Application Priority Data

Mar. 13, 1998 (DE) .......................................... 198 11 034

(51) Int. Cl.[7] .............................................. G06F 12/00
(52) U.S. Cl. .......................... 711/111; 711/161; 360/30; 360/69; 369/36
(58) Field of Search ................................ 711/111, 161, 711/162, 165, 112, 114, 100; 369/30, 36, 34, 37, 92; 360/30, 69

(56) References Cited

U.S. PATENT DOCUMENTS

| 3,876,978 | A | | 4/1975 | Bossen et al. ..... 340/146.1 AG |
| 4,860,133 | A | | 8/1989 | Baranski ...................... 360/92 |
| 5,128,912 | A | * | 7/1992 | Hug et al. ................ 360/99.02 |
| 5,323,327 | A | | 6/1994 | Carmichael et al. ........ 364/478 |
| 5,440,686 | A | * | 8/1995 | Dahman et al. ............ 345/511 |
| 5,456,528 | A | | 10/1995 | Dalziel ...................... 312/9.46 |
| 5,504,873 | A | * | 4/1996 | Martin et al. ............... 711/111 |
| 5,546,557 | A | * | 8/1996 | Allen et al. ................. 711/111 |
| 5,548,521 | A | * | 8/1996 | Krayer et al. .......... 364/478.02 |
| 5,613,154 | A | * | 3/1997 | Burke et al. .................... 710/1 |
| 5,808,828 | A | * | 9/1998 | Forrer et al. ................... 360/92 |
| 5,809,511 | A | * | 9/1998 | Peake ......................... 707/204 |
| 5,886,853 | A | * | 3/1999 | Yoshida et al. ............... 360/69 |
| 6,016,291 | A | * | 1/2000 | Joos ............................ 369/36 |
| 6,044,444 | A | * | 3/2000 | Ofek .......................... 711/162 |
| 6,098,146 | A | * | 8/2000 | Bouvier et al. ............. 711/100 |
| 6,154,791 | A | * | 11/2000 | Kimble et al. ................ 710/19 |

FOREIGN PATENT DOCUMENTS

| DE | 2421 112 C2 | | 1/1975 | ........... G06F/11/10 |
| DE | 44 05 363 A1 | | 8/1995 | |
| EP | 0280263 A2 | * | 8/1988 | |
| JP | 5-274760 A | | 10/1993 | ........... G11B/15/68 |

OTHER PUBLICATIONS

Hillyer et al. On the Modeling and Performance Characteristics of a Serpentine Tape Drive, AT&T Bell Laboratories, ACM Computing, pp 170–179, 1996.*

* cited by examiner

Primary Examiner—Matthew Kim
Assistant Examiner—Pierre Michel Bataille
(74) Attorney, Agent, or Firm—Sheridan Ross P.C.

(57) ABSTRACT

In order to design a data storage unit, comprising an archive storage means for data carrier cassettes, with at least one read/write unit and a transfer unit, and further comprising a data storage control which controls the read/write unit and the transfer unit for storing data and which is in data interchange communication with a computer, with which access to data with the computer is as efficient as possible, it is suggested that the data storage unit have in addition to the archive storage means at least one hard disk memory, that the data storage control operate the hard disk memory and the archive storage means in parallel, that the data storage control with the archive storage means and the at least one hard disk memory together form a device installable as one storage unit which communicates with the computer as a single storage unit.

44 Claims, 7 Drawing Sheets

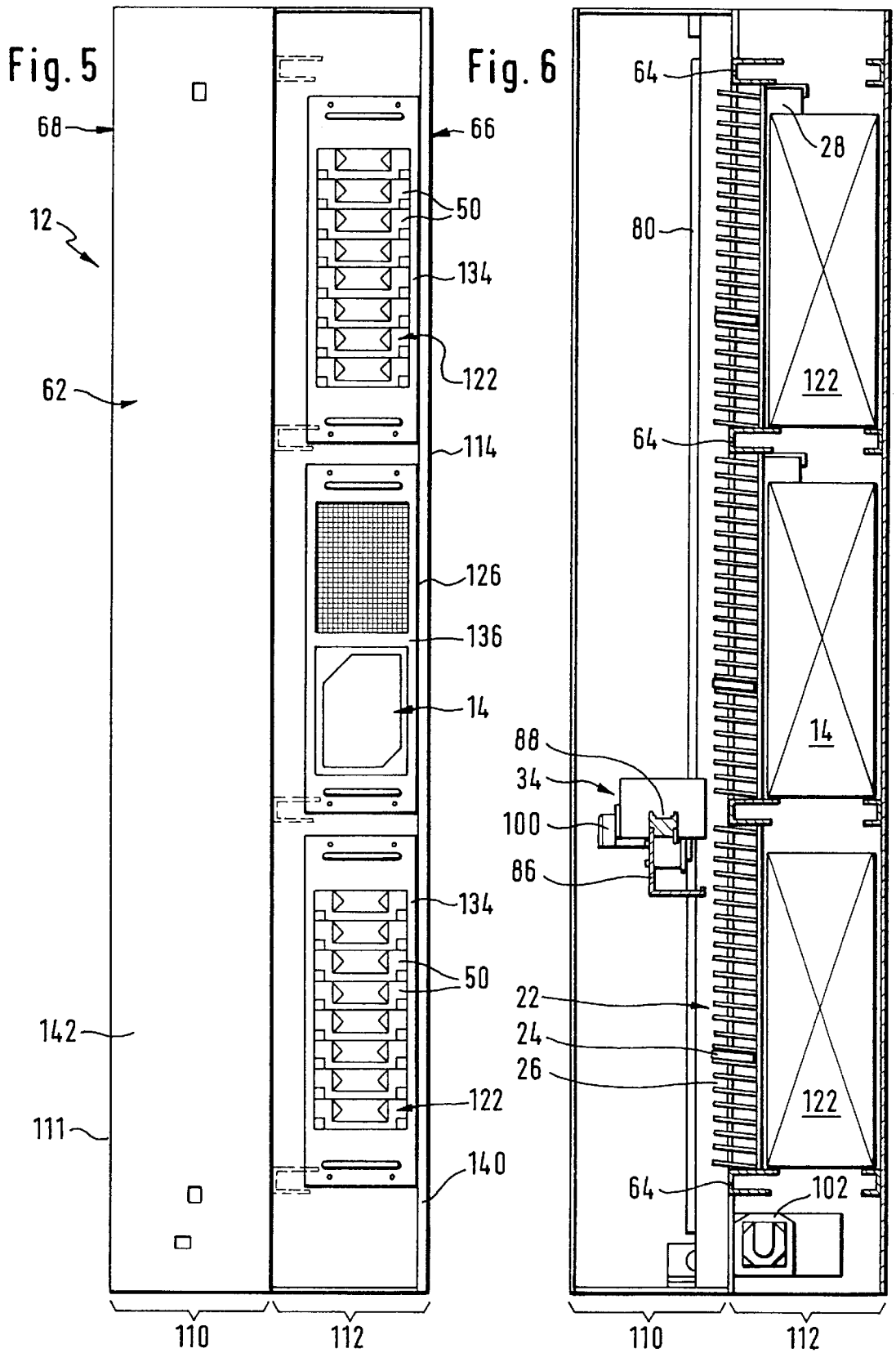

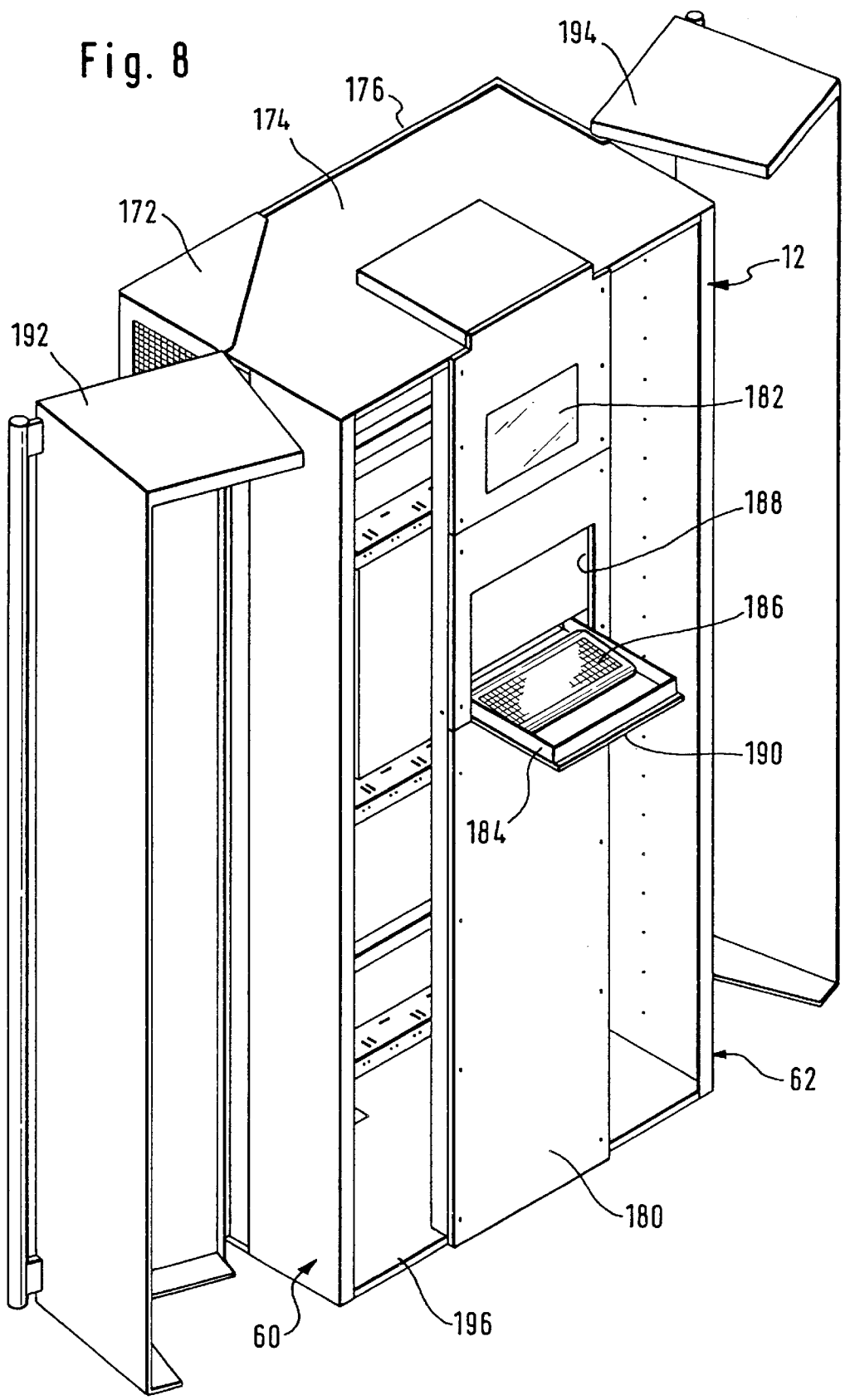

DATA CARRIER ARCHIVING AND CONTROL SYSTEM

BACKGROUND OF THE INVENTION

The invention relates to a data storage unit, comprising an archive storage means with a storage unit for a plurality of data carrier cassettes, with at least one read/write unit for the data carrier cassettes and a transfer unit, with which a transfer of individual data carrier cassettes from the storage unit into the read/write unit and vice versa can be carried out, and further comprising a data storage control which controls the read/write unit and the transfer unit for the storage of data and which is in data interchange communication with a computer in order to store data transferred from this or to make available to the computer data stored in the data store.

Data storage units of this type are known from the state of the art. The problem with them is that due to the fact that the data is written directly onto data carrier cassettes the speed of access to different sets of data is limited.

The object underlying the invention is therefore to design a data storage unit, with which access to data with the computer is as efficient as possible.

SUMMARY OF THE INVENTION

This object is accomplished in accordance with the invention, in a data storage unit the type described at the outset, in that the data storage unit has in addition to the archive storage means at least one hard disk memory for storing data to be interchanged with the computer, that the data storage control operates the hard disk memory and the archive storage means in parallel, that the data storage control with the archive storage means and the at least one hard disk memory together form a device installable as a storage unit, in which a long-term storage of the data results by means of the data carrier cassettes and which communicates with the computer as a single storage unit.

The advantage of the inventive data storage unit is to be seen in the fact that this is designed as a device which can be installed as a unit, operates as a single storage unit with respect to communication with the computer and can thus be connected to a computer in a simple manner. The advantage of this solution is also to be seen in the fact that a device representing a unit is available to the user, in which the archive storage means, the hard disk memory and the data storage control are permanently installed with respect not only to the hardware but also to the software and so the use of this data storage unit does hot require any knowledge concerning the handling of the data storage in the two completely different storage types, namely the archive storage means and the hard disk memory, for operating the data storage unit.

The inventive data storage unit is thus simple to install since the data storage control communicates with the computer like a single, conventional memory but is in a position, internally, to convert data stored on the hard disk memory onto the data carrier cassettes as an inexpensive storage medium suitable for large amounts of data.

It is particularly favorable when the data storage control operates the archive storage means and the hard disk memory in such a manner that these allow an interchange of data with the computer in the order of magnitude of data interchange rates corresponding to a hard disk memory.

With data interchange rates in the order of magnitude of those of a conventional hard disk memory, the desired, rapid communication with the computer is possible, on the one hand, and, on the other hand, however a long-term storage of data by means of the data carrier cassettes can take place, whereby, on the one hand, an increased data protection is ensured and, on the other hand, the storage of large amounts of data is possible inexpensively.

The data storage control preferably operates such that when a data carrier cassette is not already located in the read/write unit data interchanged with the computer is stored temporarily in the hard disk memory and an interchange of data takes place between the hard disk memory and the data carrier cassettes either prior to the data communication with the computer or after the data communication with the computer.

A particularly favorable solution with respect to the installation, which has proven to be particularly favorable for the set up and operation of a data storage unit of such a construction, provides for the data storage unit to have a housing, in which the archive storage means, the data storage control and the at least one hard disk memory are arranged and permanently installed.

This solution has the great advantage that with it operation and installation of such a data storage unit in conjunction with a computer can take place in such a manner as if it were a single storage unit to be connected to the computer. With respect to operation and installation expenses a particularly favorable solution is thus available.

Moreover, this solution has the additional great advantage that the operational safety is also considerably increased due to the fact that all three units, namely archive storage means, hard disk memory and data storage control are permanently installed and synchronized with one another.

Since the units archive storage means, hard disk memory and data storage control, when they are intended to be installed and operated as a uniform device, should result in as compact a device as possible, it is preferably provided for a frame of the data storage unit to have two frame segments, wherein the archive storage means is arranged in one frame segment and the data storage control and the at least one hard disk memory are arranged in the other frame segment. This division of the frame into two frame segments has the great advantage that with it an optimum arrangement of the individual units can be selected with respect to the space requirements and accessibility.

In this respect, it is particularly favorable when the two frame segments are designed as flat parallelepipeds and extend parallel to a vertical line with their flat sides.

In this respect, it is particularly expedient when the two frame segments extend essentially over the entire height of the frame in a vertical direction.

It is preferably provided for the frame segments to extend with their flat sides parallel to a frame front and form directly behind the frame front a front frame segment and a rear frame segment arranged behind this.

With respect to the distribution of the individual units between the two frame segments, no further details have so far been given. It is particularly favorable, for example, with respect to the access possibly required for maintenance when the storage unit, the at least one read/write unit and the transfer unit are arranged in the front frame segment.

Furthermore, it has proven to be expedient on account of the less frequent accessibility when the data storage control and the at least one hard disk memory are arranged in the rear frame segment.

With respect to the type of arrangement of the data storage control and the hard disk memories in the rear frame segment, no further details have so far been given. One advantageous embodiment, for example, provides for the rear frame segment to have receiving means for the data storage control and the at least one hard disk memory, their front sides being located on one side of the frame. This means that the receiving means are easily accessible from one side of the frame so that, for example, the data storage control and/or the at least one hard disk memory are, on the one hand, easily accessible in the region of their front sides and can also be disassembled easily for the purpose of maintenance.

In this respect, it is particularly favorable when the receiving means for the data storage control and the at least one hard disk memory are arranged one above the other in a vertical direction so that the frame segment accommodating them does not require a large constructional depth.

In this respect, it is particularly favorable when the data storage control is arranged such that its flat side with the greatest extension extends parallel to the flat side of the frame segments.

In order to be able to connect the data storage control favorably to the other units, it is preferably provided for the rear frame segment to form a connection area, on which the receiving means for the data storage control and the at least one hard disk memory border with a rear side. This means that the individual units are accessible in a simple manner for connection to one another and all the cables can be favorably arranged in a single connection area in the rear frame segment.

The connection area is arranged, for example, such that it is located in the rear frame segment so as to be opposite the front side of the receiving means, preferably near to a side of the frame located opposite the front side of the receiving means.

With respect to the arrangement of the read/write units in the front frame segment, no further details have so far been given. One advantageous embodiment, for example, provides for the front frame segment to have at least one receiving means for the at least one read/write unit and for the receiving means to border with a rear side on the connection area in the rear frame segment. This solution has the great advantage that with it not only the read/write units but also the data storage control and the hard disk memories can be connected to one another in a simple manner by cables guided in the connection area without any great distances needing to be overcome and so the ease of maintenance of the inventive data storage unit, in particular, can also be increased since all the connections between the individual units are comprised in the one connection area.

In this respect, it is particularly favorable when the front frame segment has several receiving means for several read/write units which all border on the connection area with their rear side.

In order to attain as favorable an arrangement as possible when arranging the read/write units, particularly one which allows an optimum saving on space, it is preferably provided for the receiving means for the read/write units to be arranged one above the other.

With respect to the arrangement of the read/write units in the receiving means, no further details have so far been given. It would, for example, be conceivable to dimension the front frame segment such that this can accommodate all the read/write units. It is, however, particularly favorable, again for reasons of saving on space, when the read/write units arranged in the receiving means project into the connection area with their rear sides so that the connection area can be used in addition for accommodating the read/write units having a relatively large extension transversely to the flat side of the front frame segment.

In conjunction with the preceding embodiments, the construction of the storage unit itself has not be specified in greater detail. One advantageous solution, for example, provides for the storage unit to have individual storage compartments for accommodating the data carrier cassettes.

In this respect, the storage compartments are preferably provided with insertion openings which are all arranged in one storage plane.

With such a construction the storage unit may be served by the transfer unit in a particularly favorable manner.

Furthermore, it is preferably provided for the read/write units to have insertion compartments, the insertion openings of which are all located in one insertion plane. Such an arrangement of the read/write units likewise has the advantage of an easy accessibility on the part of the transfer unit.

Furthermore, the transfer unit is preferably designed such that a gripper means is movable with it in a handling plane, wherein the handling plane preferably extends parallel to the storage plane and to the insertion plane. It is particularly favorable when the storage plane and the access plane coincide with one another and the handling plane is located in front of these two coinciding planes.

In this respect, it is particularly favorable when the transfer unit has a gripper means for the data carrier cassettes, with which access to the data carrier cassettes is possible in an access direction extending transversely to the handling plane.

A particularly favorable arrangement of the individual units provides for the storage plane, the insertion plane and the handling plane to extend parallel to the flat side of the front frame segment so that a particularly space-saving possibility is thereby given for the arrangement.

With respect to the user friendliness of the inventive data storage unit, no further details have been given in conjunction with the preceding description of the individual embodiments. One advantageous solution, for example, provides for the housing to have a front wall, in which a screen interacting with the data storage control is arranged. This solution has the advantage that a user of the inventive data storage unit can communicate with the data storage control in a simple manner, particularly when this is arranged in the rear frame segment and thus not accessible in a favorable manner.

Furthermore, the communication with the data storage control can also be facilitated, in addition, when a keyboard for the communication with the data storage control is arranged in the region of the front wall. Such a keyboard is preferably arranged beneath the screen.

Since such a keyboard is indeed desirable for the communication with the data storage control but, during normal operation of the inventive data storage unit, is not constantly required, it is preferably provided for the keyboard to be swung into and out of a keyboard receiving means in the front wall of the housing so that the keyboard does not require any additional space during normal use of the inventive data storage unit and is swung out into an ergonomically favorable position which does require space only when a communication with the data storage control is necessary which can, for example, be the case for the purpose of maintenance or during the interchange of data carrier cassettes.

BRIEF DESCRIPTION OF THE DRAWINGS

Additional features and advantages of the invention are the subject matter of the following description as well as the drawings illustrating one embodiment. In the drawings:

FIG. 5 shows a side view in the direction of arrow B in FIG. 2;

FIG. 6 shows a section along line 6—6 in FIG. 3;

FIG. 8 shows an illustration of the data storage unit according to FIG. 7 with rotary doors swung open.

DETAILED DESCRIPTION OF THE INVENTION

Figure 1:
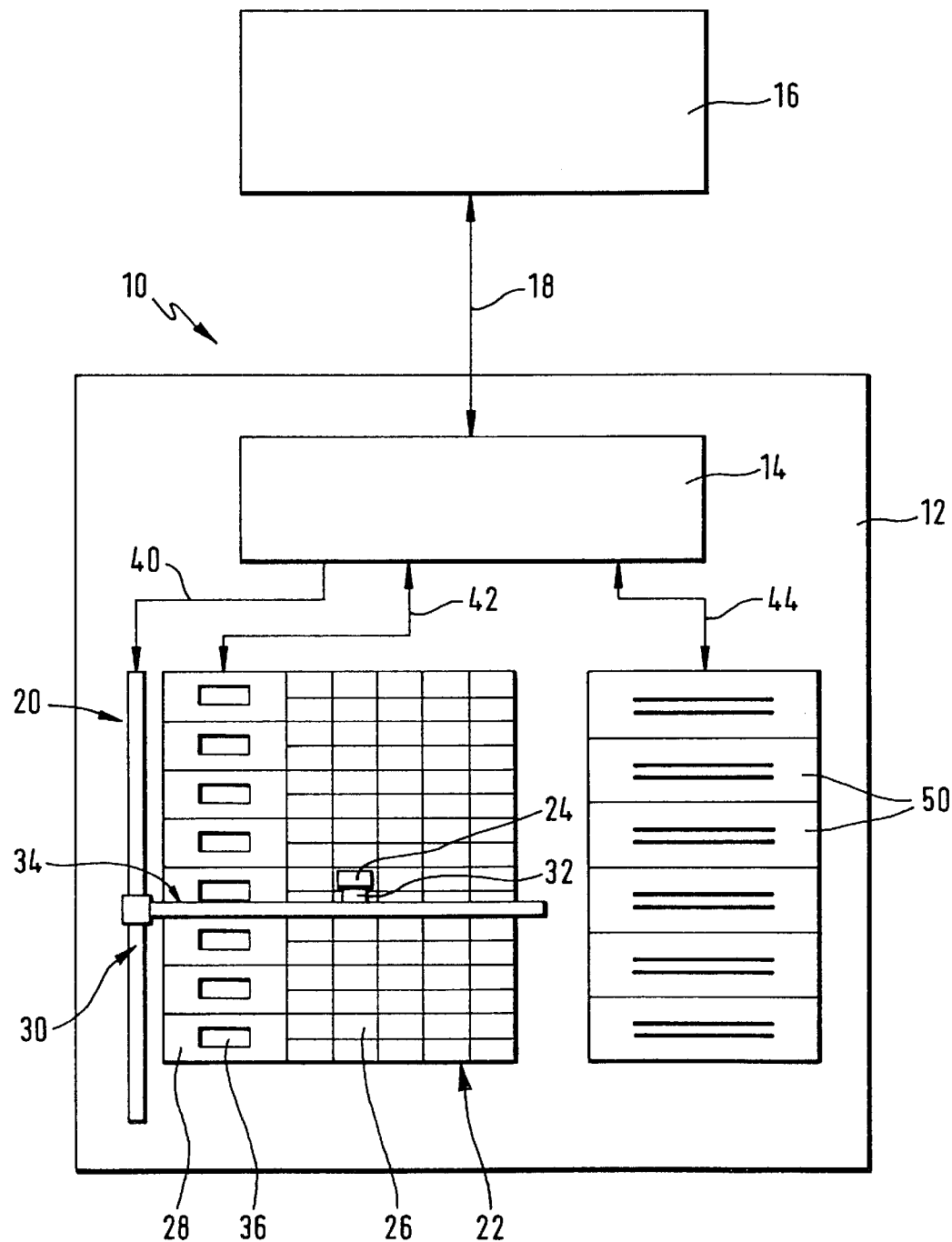
FIG. 1 shows a schematic illustration of one embodiment of the inventive data storage unit in the form of blocks associated with individual units of the data storage unit as well as the communication of the inventive data storage unit with a computer.

One embodiment of an inventive data storage unit, schematically illustrated in FIG. 1 and designated as a whole as 10, comprises a frame which is schematically designated as 12 and in which a data storage control 14 is arranged which communicates with an external computer 16 or a network and thus with several computers and interchanges data via a path 18. The data storage control 14 operates an archive storage means which is designated as a whole as 20 and has a storage unit 22 for data carrier cassettes 24, wherein the storage unit 22 comprises a plurality of storage compartments 26 for data carrier cassettes 24. Moreover, the archive storage means 20 comprises several read/write units 28, into which the data carrier cassettes 24 can be inserted in order to write data on them or read data from them.

In order to transport the data carrier cassettes 24 between the read/write units 28 and the storage compartments 26 of the storage unit 22, a transfer unit is provided which is designated as a whole as 30 and has, for example, a gripper means 32, with which data carrier cassettes 24 can be gripped in the storage compartments 26 of the storage unit and transported to the read/write units 28 or gripped in these read/write units 28 and transferred to the storage compartments 26.

The gripper means 32 is preferably mounted on a handling unit 34 of the transfer unit 30 and can be moved back and forth by the handling unit 34 between the storage compartments 26 and various insertion compartments 36 of the read/write units 28.

In order to insert the individual data carrier cassettes 24 into the respective read/write units 28, to write on them and read them and thereafter deposit them again in the storage compartments 26 of the storage unit 22, the data storage control 14 controls the transfer unit 30 via a communication path 40, i.e., in particular, its handling unit 34 and its gripper means 32, and the read/write units 28 via a communication path 42, wherein data to be stored on the data carrier cassettes 24 or data read from the data carrier cassettes 24 is also transferred via the communication path 42.

The data storage control 14 is connected, in addition, via a communication path 44 to several hard disk memories 50 which are likewise arranged in the frame 12 and serve to store temporarily the data transferred from the data storage control 14.

The data storage control 14 communicating with the computer 16 via the data line 18 interchanges data with the computer 16 via the path 18 at a data interchange rate as if the entire data storage unit 10 were a hard disk memory. For this purpose, the data storage control 14 first of all stores in the hard disk memories 50, for example, data transferred via the path 18 of the inventive data storage unit 10—particularly when these are sets of data which are not simply to be written successively onto one tape as a whole—in order to then transfer this data onto data carrier cassettes 24 in the various read/write units 28 when no more data is being transferred or requested by the computer 16, wherein the recorded data carrier cassettes 24 are then deposited by the transfer unit 30 in the storage compartments 26 of the storage unit 22. Should a rapid transfer of data via the data line 18 to the computer 16 be necessary, for example, when the computer 16 requests a specific type of data stored on the data carrier cassettes 24—in particular, sets of data not stored in a connected manner on a single tape—, the data storage control 14 first of all actuates the transfer unit 30 in such a manner that it locates the corresponding data carrier cassettes 24 in the respective storage compartments 26 of the storage unit 22, inserts them into the insertion compartments 36 of the read/write units 28 so that the inserted data carrier cassettes 24 can then be read in the read/write units and the data transferred to the hard disk memories 50, in which this data is then available upon request by the computer 16 at the data interchange rate customary for hard disk memories.

If, however, sets of data are intended to be stored, for example, in a connected manner one after the other on one tape or read from this tape, the data storage control 14 can also have direct access to this tape in the respective read/write unit 28 since, in this case, a data interchange rate is possible which corresponds at least to that with a hard disk memory.

Thus, it is possible altogether to carry out communication between the computer and the inventive data storage unit as a whole in such a manner as if the inventive data storage unit 10 were merely a hard disk memory 50 although, in the end, the data is stored securely and inexpensively for a long-term storage on data carrier cassettes 24.

Figure 2:
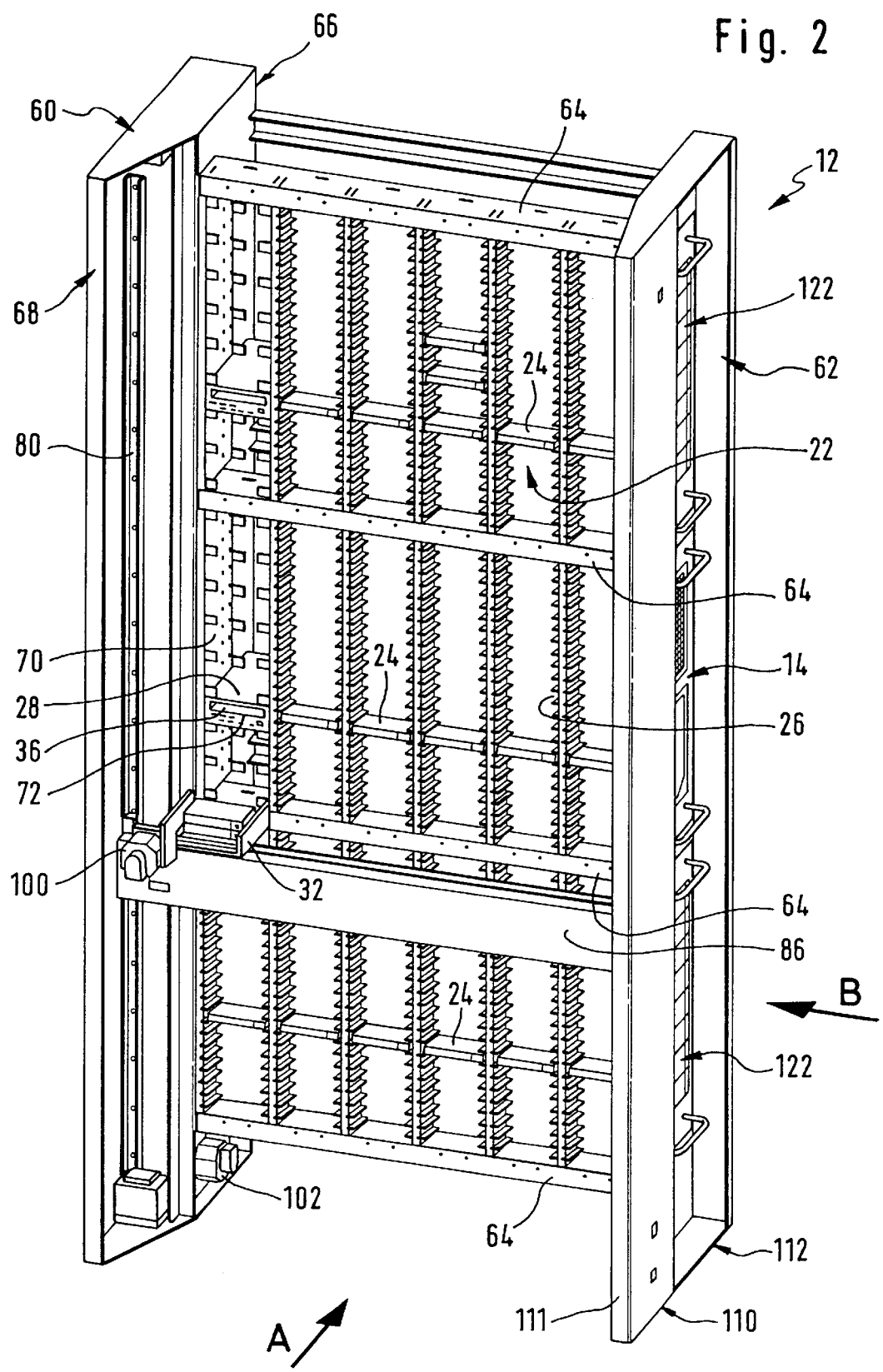
FIG. 2 shows a specific illustration of a frame of the inventive data storage unit with units installed in it.
Figure 3:
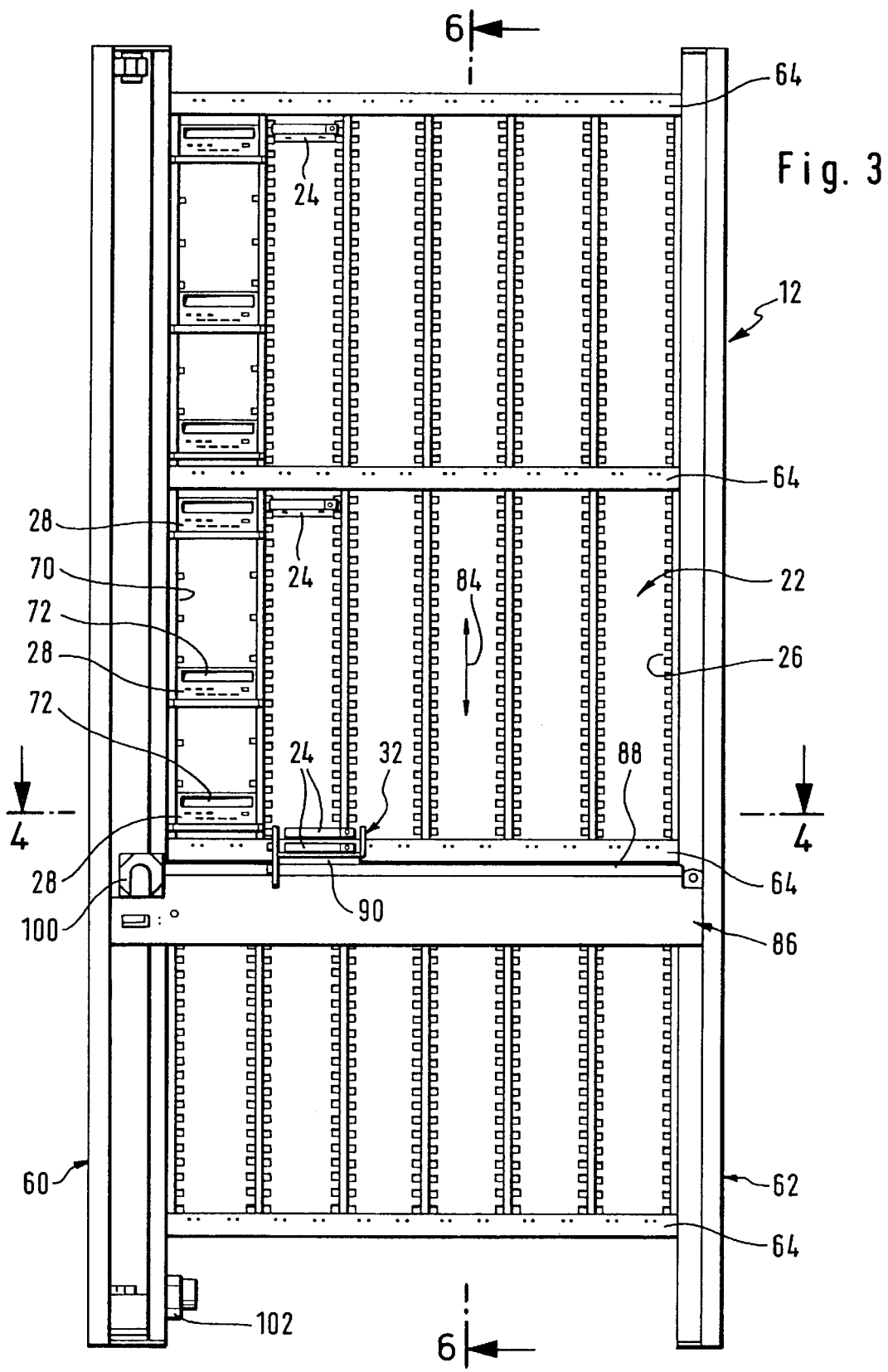
FIG. 3 shows a plan view in the direction of arrow A in FIG. 2.

As illustrated in FIGS. 2 and 3, the frame is constructed such that this has two side walls 60 and 62 which form lateral uprights and between which cross supports 64 extend, wherein the cross supports 64 are located approximately in a central region between a rear side 66 of the frame and a front side 68 of the frame.

The storage unit 22 with its cassette compartments 26 is arranged between the supports 64, wherein the data carrier cassettes 24 can be deposited in the cassette compartments 26. The entire storage unit 22 extends, for example, proceeding from the side wall 62 in the direction of the side wall 60 but not quite as far as this. Near to the side wall 60, receiving means 70 for the read/write units 28 are provided between this side wall and the storage unit 22 and the data carrier cassettes 24 from the storage unit 22 can be inserted into their insertion compartments 36.

Figure 4:
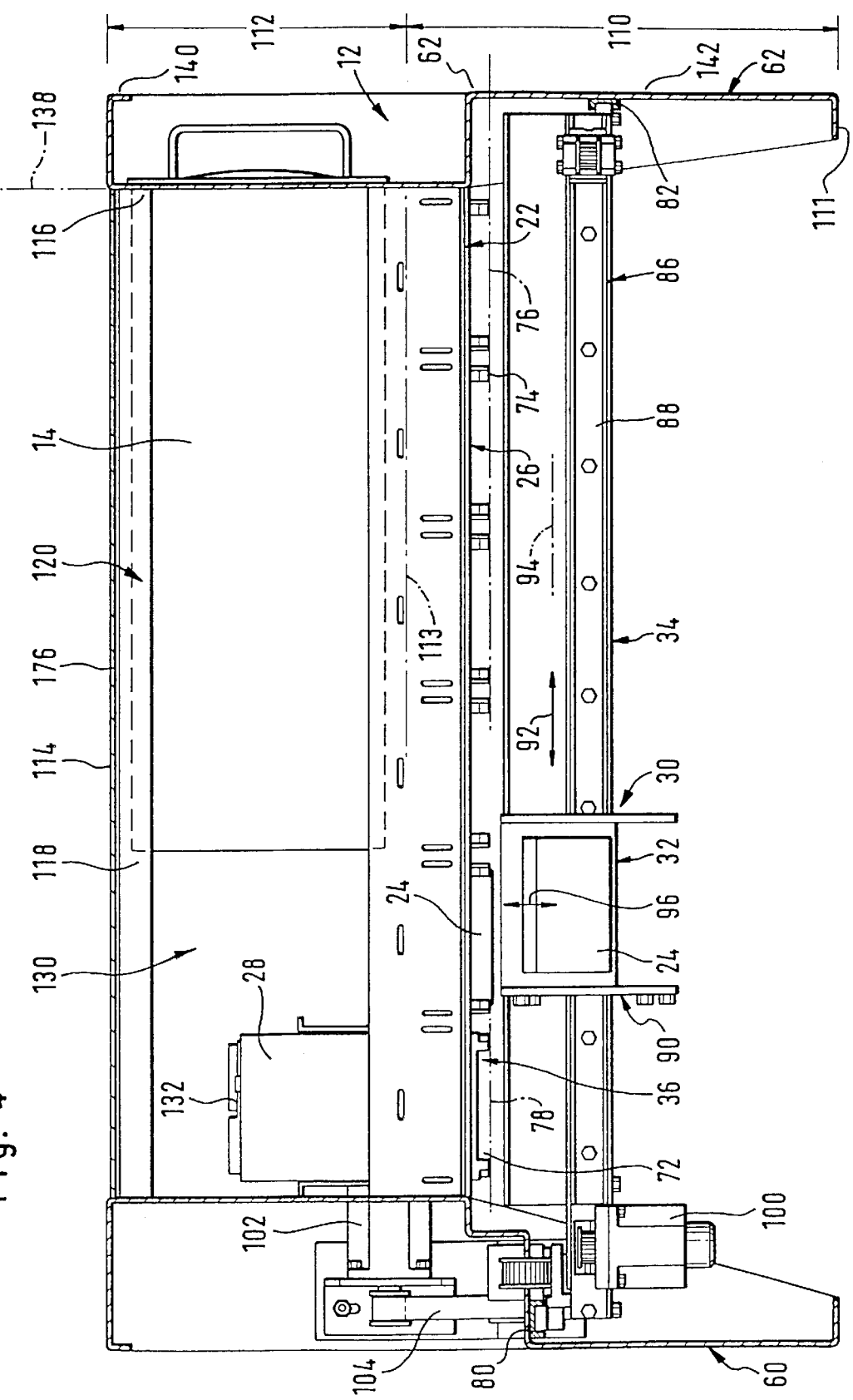
FIG. 4 shows a section along line 4—4 in FIG. 3.

As illustrated in FIG. 4, the storage compartments 26 of the storage unit 22 are preferably located such that their front sides 74 are located in a common storage plane 76 which extends, for example, parallel to the cross supports 64.

Furthermore, the read/write units 28 are also inserted into the receiving means 70 in such a manner that insertion openings 72 of their insertion compartments 36 are located in an insertion plane 78 which extends parallel to the storage plane 76, is preferably aligned with this.

The handling unit 34 of the transfer unit 30 comprises two longitudinal guide means 80 and 82 which extend in a vertical direction and are held on the side walls 60 and 62. A gripper support 86 of the handling unit 34 can be moved up and down on these two longitudinal guide means 80 and 82 in a vertical direction 84, and a slide 90, which supports the gripper means 32 and by which the gripper means 32 is displaceable in a direction 92 transverse to the vertical direction 84, is guided on the gripper support 86 via a longitudinal guide means 88.

The gripper means 32 is thus movable not only in the vertical direction 84 but also in the transverse direction 92 and thus in a handling plane 94, wherein the handling plane 94 extends parallel to the storage plane 76 and to the insertion plane 78.

Moreover, the gripper means 32 is provided with an access element which is not illustrated in the drawings and which is movable in an access direction 96 in the direction of the storage compartments 26 or the insertion compartments 36 in order to be able to have access to a respective data carrier cassette 24 located therein and then be able to transport and transfer this data carrier cassette 24.

In order to move the slide 90 along the gripper support 86, this is provided with a drive motor 100 which is movable with the gripper support 86 in the vertical direction 84. The motor 100 drives, for example, the slide 90 in the transverse direction 92 via a toothed belt which is not illustrated in the drawings.

In the same way, a motor 102, with which a toothed belt 104 is movable for lifting and lowering, i.e., moving the entire gripper support 86 in the vertical direction 84, is arranged on the frame 10, preferably in a base region of the side wall 60.

In order to accommodate the entire archive storage means 20, the frame 12 comprises a front frame segment 110, in which the storage unit 22, the receiving means 70 for the read/write units 28 as well as the entire handling unit 34 are arranged and guided.

In this respect, the front frame segment 110 extends in the vertical direction 84 essentially over the entire height of the frame 12 and over the entire width thereof in the transverse direction 92 and terminates towards the front with a front side 111.

A rear frame segment 112 is located behind the front frame segment 110 and this is located between the front frame segment 110 and a rear side 114 of the frame 12 and has with the front frame segment a common flat side 113 which forms at the same time a plane of separation between the two.

Receiving means 120 are provided in this rear frame segment 112 and these are located with their front sides 116 in the region of the side wall 62 and extend into the rear frame segment 112 in the direction of the side wall 60 as far as a rear side 118. These receiving means serve to accommodate the data storage control 14 and hard disk memories 50, wherein the hard disk memories 50 are arranged in stacks 122 one above the other.

The data storage control 14 is preferably arranged between two stacks 122 of hard disk memories 50, wherein this is installed such that the longest housing side 126 extends approximately parallel to the vertical 84 and parallel to the rear side 114.

Not only the receiving means 120 for the stacks 122 of hard disk memories 50 but also the data storage control 14 border with their rear side 118 on a connection area 130 which is located between the rear side 118 of the receiving means 120 and the side wall 60.

The connection area 130 is, in addition, arranged such that the read/write units 28 inserted into the receiving means 70 can also extend with their device rear side 132 into the connection area 130 so that not only the read/write units 28 but also the data storage control 14 and the stacks 122 of hard disk memories 50 are accessible from their rear sides for the connection of cables which are all arranged in the connection area 130 and extend therein. The number of hard disk memories 50 in the stacks 122 is preferably selected at the most such that these extend essentially over the entire height of the frame 12 together with the data storage control 14 inserted into the receiving means 120.

All the hard disk memories 50 and the data storage control 14 are thus arranged such that their front sides 134 and 136 are located in a front side plane 138 which is set back in relation to lateral outer wall surfaces 140 and 142 of the side wall 62 so that the front sides 134 and 136 are protected against knocks.

Such an arrangement of the hard disk memories 50 and the data storage control 14 in the rear frame segment 112 behind the front frame segment 110 allows a particularly space-saving installation of the hard disk memories 50 and the data storage control 14.

Figure 7:
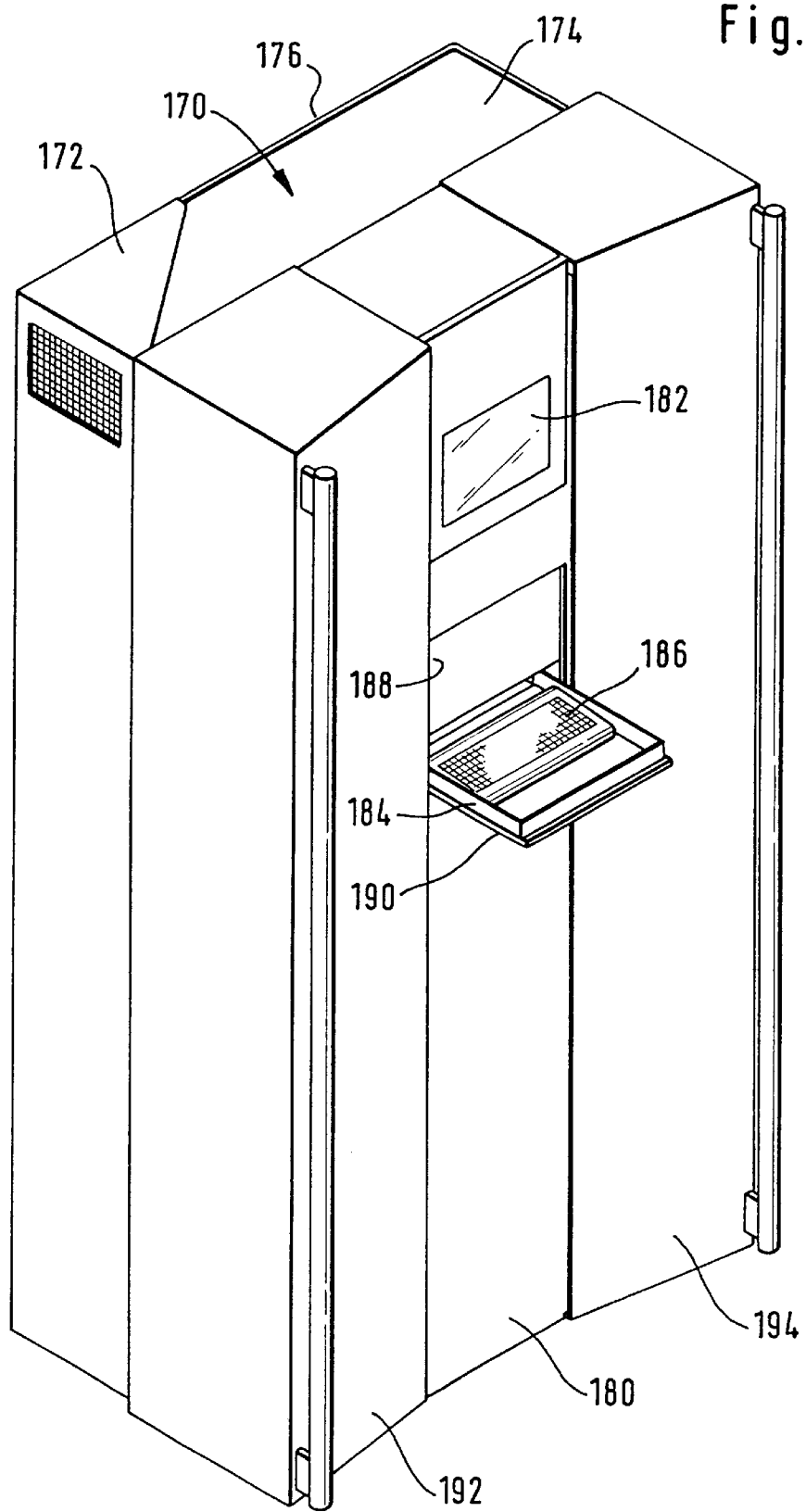
FIG. 7 shows a perspective illustration of an inventive data storage unit with a housing surrounding the frame and the units.

The frame 12 is, as illustrated in FIGS. 7 and 8, surrounded by an outer housing 170 which is provided with a removable, rear, partial cover 172 for the rear frame segment 112 for facilitating access to the connection area 130.

Furthermore, the housing 170 has a cover 174 for the frame 12 as well as a rear wall 176 which engages over the frame 12, i.e. the rear frame segment 112, on the rear side supplementary to the partial cover 172.

Furthermore, the housing 170 is provided with a front center wall 180 which is located between the side walls 60 and 62 and bears in its upper region a screen 182 which serves as indicator for the data storage control 14.

A hinged shelf 184 is provided in the front center wall 180 beneath the screen 182 and a keyboard 186 is arranged on it for operating the data storage control 14.

The hinged shelf 184 can thereby be swung into a recess or cavity 188 in the front center wall 180 and in its state swung into the recess 188 closes the center wall 180 with a base 190.

In the swung-out state, as illustrated in FIGS. 7 and 8, the keyboard 186 is accessible at an ergonomically favorable height.

Furthermore, pivotable side sections 192 and 194 of the housing 170 are arranged on both sides of the front center wall 180 of the housing 170 and these side sections, in the swung-open state illustrated in FIG. 8, allow access to the insertion compartments 36 of the read/write units 28 as well as partial access to the storage compartments 26 of the storage unit 22 and in the closed state close a front opening 196 of the frame 12 on both sides of the front center wall 180.

What is claimed is:

1. Data storage unit, comprising an archive storage means with a storage unit for a plurality of data carrier cassettes, with at least one read/write unit for the data carrier cassettes and a transfer unit for transferring individual data carrier cassettes from the storage unit into the read/write unit and vice versa, said data storage unit further comprising at least one hard disk memory for storing data, a data storage control for controlling the read/write unit and the transfer unit for the storage of data and for providing a long term storage of the data by means of data carrier cassettes, said data storage control operating the hard disk memory and the archive storage means in parallel, said data storage control being in data interchange communication with a computer in order to store data transferred from this computer or make available to the computer data stored in the data storage unit, a housing comprising a frame having two frame segments designed as flat parallelepipeds having flat sides which extend parallel to a vertical line, the archive storage means, the data storage control and the at least one hard disk memory being arranged and permanently installed in said frame, wherein the archive storage means is arranged in one frame segment and the data storage control and the at least one hard disk memory are arranged in the other frame segment, said data storage control being permanently operatively connected with the archive storage means and the at least one hard disk memory so as to be installable as a single data storage unit for communicating with the computer.

2. Data storage unit as defined in claim 1, characterized in that the frame segments extend essentially over the entire height of the frame in a vertical direction.

3. Data storage unit as defined in claim 1, characterized in that the frame segments extend with their flat sides parallel to a frame front and form directly behind the frame front a front frame segment and a rear frame segment located behind the front frame segment.

4. Data storage unit as defined in claim 3, characterized in that the storage unit, the at least one read/write unit and the transfer unit are arranged in the front frame segment.

5. Data storage unit as defined in claim 3, characterized in that the data storage control and the at least one hard disk memory are arranged in the rear frame segment.

6. Data storage unit as defined in claim 5, characterized in that the rear frame segment has receiving means for the data storage control and the at least one hard disk memory, the front sides thereof being located on one side of the frame.

7. Data storage unit as defined in claim 5, characterized in that the receiving means for the data storage control and the at least one hard disk memory are arranged one above another in a vertical direction.

8. Data storage unit as defined in claim 5, characterized in that the data storage control is arranged such that its flat side with the greatest extension extends parallel to the flat side of the frame segments.

9. Data storage unit as defined in claim 3, characterized in that the rear frame segment forms a connection area, the receiving means for the data storage control and the at least one hard disk memory bordering on said connection area with their rear side.

10. Data storage unit as defined in claim 9, characterized in that the connection area is located in the rear frame segment so as to be opposite the front side of the receiving means.

11. Data storage unit as defined in claim 3, characterized in that the front frame segment has at least one receiving means for the art least one read/write unit and that the receiving means borders with a rear side on the connection area in the rear frame segment.

12. Data storage unit as defined in claim 11, characterized in that the front frame segment has several receiving means for several read/write units all bordering on the connection area with their rear side.

13. Data storage unit as defined in claim 11, characterized in that the receiving means for the read/write units are arranged one above the other.

14. Data storage unit as defined in claim 11, characterized in that the read/write units arranged in the receiving means project into the connection area with their rear sides.

15. Data storage unit, comprising:

an archive storage means with a storage unit for a plurality of data carrier cassettes, with at least one read/write unit for the data carrier cassettes and a transfer unit for transferring individual data carrier cassettes from the storage unit into the read/write unit and vice versa;

at least one non-removable hard disk memory for storing data used by an external computer;

a data storage control controlling the read/write unit and the transfer unit for the storage of data within said archive storage means and for providing a long term storage of the data by means of data carrier cassettes;

said data storage control operating said at least one non-removable hard disk memory and the archive storage means in parallel;

a housing comprising a frame, the archive storage means, the data storage control and said at least one non-removable hard disk memory being arranged and installed in said frame;

said data storage control being operatively connected with respect to the hardware and software installation with the archive storage means and the at least one non-removable hard disk memory so that said data storage unit is installable as a single conventional data storage unit for communicating with the external computer by establishing a link between said external computer and said archive storage means and said at least one non-removable hard disk memory only via said data storage control which is in data interchange communication with the external computer in order to store data transferred from the external computer or make available to the external computer data stored in said data storage unit.

16. Data storage unit as defined in claim 15, characterized in that the data storage control operates the archive storage means and the hard disk memory in such a manner that an interchange of data between the computer and the data storage unit has data rates in the order of magnitude of data interchange rates corresponding to a hard disk memory.

17. Data storage unit as defined in claim 15, characterized in that when a desired data carrier cassette is not already located in the read/write unit, data interchanged with the computer is stored temporarily in the hard disk memory and an interchange of data takes place between the hard disk memory and the data carrier cassettes either prior to the data communication with the computer or after the data communication with the computer.

18. Data storage unit as defined in claim 15, characterized in that said frame has two frame segments, wherein the archive storage means is arranged in one frame segment and the data storage control and the at least one hard disk memory are arranged in the other frame segment.

19. Data storage unit, comprising an archive storage means with a storage unit for a plurality of data carrier cassettes, with at least one read/write unit for the data carrier cassettes and a transfer unit for transferring individual data carrier cassettes from the storage unit into the read/write unit and vice versa, said data storage unit further comprising at least one hard disk memory for storing data, a data storage control for controlling the read/write unit and the transfer unit for the storage of data and for providing a long term storage of the data by means of data carrier cassettes, said data storage control operating the hard disk memory and the archive storage means in parallel, said data storage control being in data interchange communication with an external computer in order to store data transferred from this external computer or make available to the external computer data stored in the data storage unit, a housing comprising a frame, the archive storage means, the data storage control and the at least one hard disk memory being arranged and installed in said frame, said data storage control being operatively connected with respect to the hardware and software installation with the archive storage means and the at least one hard disk memory so that said data storage unit is installable as a single conventional data storage unit for communicating with the external computer by establishing a link between said external computer and said data storage control, wherein said frame has two frame segments, wherein the archive storage means is arranged in one frame segment and the data storage control and the at least one hard disk memory are arranged in the other frame segment, and wherein the two frame segments are designed as flat parallelepipeds having flat sides which extend parallel to a vertical line.

20. Data storage unit, comprising an archive storage means with a storage unit for a plurality of data carrier cassettes, with at least one read/write unit for the data carrier cassettes and a transfer unit for transferring individual data carrier cassettes from the storage unit into the read/write unit and vice versa, said data storage unit further comprising at least one hard disk memory for storing data, a data storage control for controlling the read/write unit and the transfer unit for the storage of data and for providing a long term storage of the data by means of data carrier cassettes, said data storage control operating the hard disk memory and the archive storage means in parallel, said data storage control being in data interchange communication with an external computer in order to store data transferred from this external computer or make available to the external computer data stored in the data storage unit, a housing comprising a frame, the archive storage means, the data storage control and the at least one hard disk memory being arranged and installed in said frame, said data storage control being operatively connected with respect to the hardware and software installation with the archive storage means and the at least one hard disk memory so that said data storage unit is installable as a single conventional data storage unit for communicating with the external computer by establishing a link between said external computer and said data storage control, wherein said frame has two frame segments, wherein the archives storage means is arranged in one frame segment and the data storage control and the at least one hard disk memory are arranged in the other frame segment, and wherein the frame segments extend essentially over the entire height of the frame in a vertical direction.

21. Data storage unit as defined in claim 19, characterized in that the frame segments extend with their flat sides parallel to a frame front and form directly behind the frame front a front frame segment and a rear frame segment located behind the front frame segment.

22. Data storage unit as defined in claim 21, characterized in that the storage unit, the at least one read/write unit and the transfer unit are arranged in the front frame segment.

23. Data storage unit as defined in claim 21, characterized in that the data storage control and the at least one hard disk memory are arranged in the rear frame segment.

24. Data storage unit as defined in claim 23, characterized in that the rear frame segment has receiving means for the data storage control and the at least one hard disk memory, the front sides thereof being located on one side of the frame.

25. Data storage unit as defined in claim 23, characterized in that the receiving means for the data storage control and the at least one hard disk memory are arranged one above another in a vertical direction.

26. Data storage unit as defined in claim 23, characterized in that the data storage control is arranged such that its flat side with the greatest extension extends parallel to the flat side of the frame segments.

27. Data storage unit as defined in claim 21, characterized in that the rear frame segment forms a connection area, the receiving means for the data storage control and the at least one hard disk memory bordering on said connection area with their rear side.

28. Data storage unit as defined in claim 27, characterized in that the connection area is located in the rear frame segment so as to be opposite the front side of the receiving means.

29. Data storage unit as defined in claim 21, characterized in that the front frame segment has at least one receiving means for the art least one read/write unit and that the receiving means borders with a rear side on the connection area in the rear frame segment.

30. Data storage unit as defined in claim 29, characterized in that the front frame segment has several receiving means for several read/write units all bordering on the connection area with their rear side.

31. Data storage unit as defined in claim 29, characterized in that the receiving means for the read/write units are arranged one above the other.

32. Data storage unit as defined in claim 29, characterized in that the read/write units arranged in the receiving means project into the connection area with their rear sides.

33. Data storage unit as defined in claim 15, characterized in that the housing has a front wall, a screen interacting with the data storage control being arranged in said front wall.

34. Data storage unit as defined in claim 15, characterized in that a keyboard for communication with the data storage control is arranged proximate a front wall of the housing.

35. Data storage unit as defined in claim 34, characterized in that the keyboard is adapted to be swung into and out of a keyboard receiving means in the front wall of the housing.

36. Data storage unit as defined in claim 1, characterized in that the frame comprises at least two side walls connected by a plurality of cross supports, the frame being adapted to receive the data storage control, the archive storage means and the at least one hard disk memory.

37. Data storage unit as defined in claim 1, characterized in that the housing comprises a rear wall, a front wall, at least one side wall connecting the rear wall to the front wall, wherein the front wall is adapted to allow access from outside the housing to at least one of the archive storage means, the data storage control and the at least one hard disk memory arranged within the housing.

38. Data storage unit as defined in claim 37, characterized in that the housing further comprises a door connected to at least one of the front wall, the rear wall and the at least one side wall.

39. Data storage unit comprising:

an archive storage means with a storage unit for a plurality of data carrier cassettes, wherein the storage unit has storage compartments for accommodating the data carrier cassettes, with at least one read/write unit for the data carrier cassettes and a transfer unit for transferring individual data carrier cassettes from the storage unit into the read/write unit and vice versa;

at least one non-removable hard disk memory for storing data to be interchanged with an external computer via a data storage control, said data storage control being in data interchange communication with the external computer in order to store data transferred from the external computer or make available to the external computer data stored in the data storage unit, said data storage control controlling the read/write unit and the transfer unit for the storage of data within said archive storage means and operating the at least one non-removable hard disk memory and the archive storage means in parallel, said data storage control with the archive storage means and the at least one non-removable hard disk memory together allowing said data storage unit to be installed as a conventional non-removable hard disk memory wherein the data carrier cassettes provide long-term storage of the data and wherein said data storage control communicates with the external computer at a data exchange rate substantially comparable to that of a conventional non-removable hard disk memory.

40. Data storage unit as defined in claim 39, characterized in that the storage compartments are provided with insertion openings all arranged in one storage plane.

41. Data storage unit comprising:

an archive storage means with a storage device for a plurality of data carrier cassettes, with at least one read/write unit for the data carrier cassettes, and a transfer unit for transferring individual data carrier cassettes from the storage device into the read/write unit and vice versa;

at least one non-removable hard disk memory for storing data to be interchanged with an external computer via a data storage control;

said data storage control being in data interchange communication with an external computer and controlling the read/write unit and the transfer unit of said archive storage means for the storage of data and operating the at least one non-removable hard disk memory and the archive storage means in parallel, said data storage control with the archive storage means and the at least one non-removable hard disk memory together providing said data storage unit to be installed with the external computer substantially as a single conventional non-removable hard disk memory, wherein the data carrier cassettes provide long-term storage of the data interchanged with the external computer and wherein said data storage unit communicates with the external computer in substantially the same manner as a conventional non-removable hard disk memory.

42. Data storage unit comprising:

an archive storage means with a storage device for a plurality of data carrier cassettes, with at least one read/write unit for the data carrier cassettes and a transfer unit for transferring individual data carrier cassettes from the storage device into the read/write unit and vice versa, wherein the transfer unit is designed such that a gripper means is movable with said transfer unit in a handling plane;

at least one non-removable hard disk memory for storing data to be interchanged with an external computer via a data storage control which is in data interchange communication with the external computer in order to store data transferred from the external computer or make available to the external computer data stored in the data storage unit, said data storage control controlling the hardware and software associated with said archive storage means and said at least one non-removable hard disk memory and said data storage control controls the read/write unit and the transfer unit of said archive storage means and operates the at least one non-removable hard disk memory and the archive storage means in parallel, said data storage control together with said archive storage means and said at least one non-removable hard disk memory are installed with an external computer as an integral data storage unit, wherein the data carrier cassettes provide long-term storage of the data and wherein said data storage control is adapted to communicate with the external computer at a data exchange rate substantially comparable to that of a conventional non-removable hard disk memory.

43. Data storage unit as defined in claim 42, characterized in that the handling plane extends parallel to the storage plane and parallel to the insertion plane.

44. Data storage unit as defined in claim 42, characterized in that the storage plane, the insertion plane and the handling plane extend parallel to a front side of the front frame segment.

* * * * *